Aug. 20, 1968 E. ZOLLER 3,398,242

ARRANGEMENT FOR PICKING-UP, TRANSMITTING AND REGISTERING SIGNALS

Filed March 22, 1965

INVENTOR
EGON ZOLLER

BY [signature]
ATTORNEY

United States Patent Office 3,398,242
Patented Aug. 20, 1968

3,398,242
ARRANGEMENT FOR PICKING-UP, TRANSMITTING AND REGISTERING SIGNALS

Egon Zoller, 11 Lehensteig, 8037 Zurich, Switzerland

Filed Mar. 22, 1965, Ser. No. 441,545
2 Claims. (Cl. 179—18)

Figure 1:
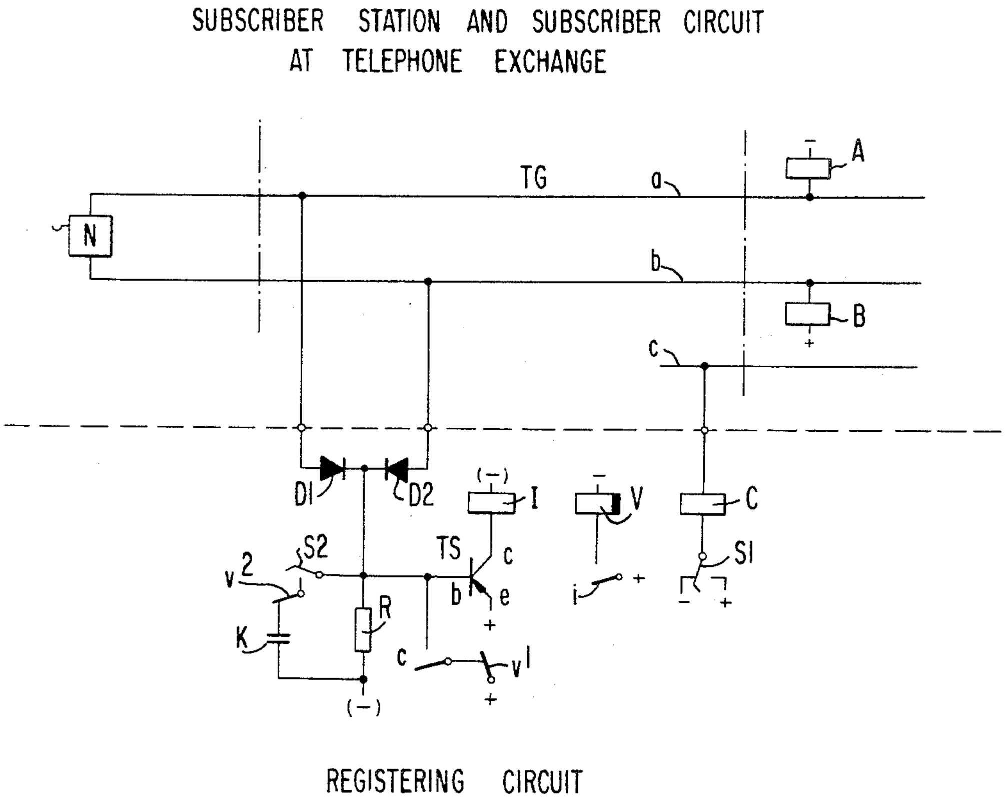

This invention concerns an arrangement for picking-up signals produced by means of calling dials or similar signal senders (communicators) from automatic telephone installations and transmitting them for registering. In order to transmit signals produced by means of calling dials or similar signal senders to the registering device, the present invention utilizes semiconductors which lie across two diodes which are connected in their through direction and bridge the talking lines. Across the center of the semiconductors lies a semiconductor amplifier with a relay in its output circuit which connects a standard type of registering device at the calling station or at the exchange.

Arrangements for registering signals produced by means of calling dials or similar signals senders from automatic telephone installations are already in existence.

In the aforesaid currently known arrangements, signals produced by means of calling dials or similar signal senders can be transmitted to the subscriber to be called or the exchange of automatic telephone installations dependent on a supervisory relay lying in the speaking loop of the calling subscriber because the registering device, apart from the supervisory relay, is also dependent on a test relay, which does not operate under the influence of the voltage flowing through the talking lines at the exchange end as a result of interruptions originating at the exchange which cause the voltage on the exchange end of the line to disappear.

It can be seen that one of the disadvantages of the aforesaid installation lies in the fact that the supervisory relay, which is bridged by the capacitor, lies in series with the speaking line, thus creating an electrical asymmetry in the talking lines, and promoting cross-talk in the cable. Furthermore, an additional frequency-dependent call attenuation is produced by the parallel circuit-reactance coil/capacitor.

A further objection to the aforesaid known arrangement lies in the fact that the ohmic resistance of the relay increases the entire resistance of the subscriber circuit which at the same time heightens the attenuation of the call.

Varying lengths of the subscriber lead which are needed in the aforesaid known arrangement creates a dependency on the loop resistance which causes undesirable high variations in the intensity of magnetization of the relay with the result that the signal transmitted for registering has an inconstant impulse ratio thus constituting a further disadvantage.

The series circuit formed through the reactance coil and through the capacitor lies transverse to the call lines during the call thus causing a further increase in the frequency-dependent call attenuation.

In those cases in which the supervisory relay is not connected in series with the subscriber line but from one of the call wires across a supervisory relay controlled by an electron tube, the disadvantages described also apply with respect to the additional impulses caused by interruptions in the subscriber lead coming from the exchange.

All of the disadvantages above mentioned are avoided by the present invention which is described in greater detail in the drawing herein and in the following description.

The arrangement for picking-up signals for transmitting and registering purposes has been designed in the present invention so that at the calling subscribers station or in the exchange of automatic telephone installations, a bridge is provided across two diodes, connected away or towards each other in their through direction and the aforesaid bridge is used between the call leads which take the form of semi-conductors and to which there is additionally provided a semi-conductor amplifier for effecting control. In the semiconductor amplifier the output circuit includes a relay which connects a registering device of standard type when a call comes from a supervised subscriber in order to transmit signals to it that have been produced by means of calling dials or similar signal generators.

A particular advantage of the present invention is that it permits a distinction to be made between those current interruptions produced by the impulse current transmitter when a number is dialed and those interruptions reaching the line from the exchange. This arrangement is equally suitable for installations in which the connections are made across registers as well as installations with direct dialing. Short interruptions in current are created each time the receiver is lifted. This happens frequently in the case of certain installations with registers but only occasionally in the case of those with direct dialing.

The arranging of the two diodes dependent on the current passage or the blocking of same between the talking lines and the amplifier input permits them to effect the connecting of the registering device and also to stop the signals created by interruptions from the exchange from reaching the registering device whereas those signals produced by dialing a number by means of the calling dial or similar signal senders are transmitted for registering by employing only one single relay.

When the subscriber station is not in operation, a very small current flows from the talking lines to the picking-up and switching device or vice versa depending on the connection of the diodes in their through direction.

During the engaged state and for the duration of the call, however, no current flows either from the talking lines to the picking-up and switching device or in the reverse direction.

The invention is illustrated in the accompanying drawing in which a single diagram shows the subscriber station and registering circuit.

FIG. 1 of the enclosed diagram represents a model of an arrangement for picking-up signals for transmitting and registering purposes, the connection between a subscriber and the exchange being indicated at the top of the figure by the legend to represent the station in a simplified form.

The bottom portion of FIG. 1 shows the registering device installed at the subscriber's station or at the exchange, not shown in the diagram, when a supervised subscriber makes a call, in which case, signals produced by the calling dial or similar signal senders are picked up and transmitted for registering, whereas those signals created in the subscriber line by interruptions from the exchange are not registered.

In FIG. 1, N represents the subscriber station, TG the subscriber circuit (subscriber frame) at the exchange, *a* and *b* are the talking lines, whilst c is the supervisory wire (*c* wire).

Coils A and B may be wound together or individually on to a relay core and can be regarded as line relays in the group selectors when the subscriber station is engaged, or as impulse relays in the register in order to indicate the operation.

D1 and D2 are the two diodes, or preferably semiconductors. In their through direction they are connected towards each other in this case in order to indicate the operation, and lie as a bridge between the talking lines whose centre is connected to the input circuit of a semiconductor amplifier in the form of a transistor TS shown in a simplified form in the diagram. V is a slow-releasing relay which can be excited across a contact *i* of relay I. V, itself, carries the contact $v^1$ and $v^2$ as well as a further contact for connecting the registering device, not shown in the diagram. C is a high-ohmic relay and lies on the *c* wire on the one side, and on the other side can be laid to the negative or positive pole of the supply battery across key (change-over switch) S1, depending on the exchange installation. It has the effect of connecting the registering device when a call comes from the supervised subscriber, whereas when a call is made to the subscriber, it prevents the registering device from being connected by closing its contact *c*, thus blocking the transistor.

The method of operation of this invention is as follows:

When the subscriber station is not in operation there is a maximum negative potential on the *a* wire compared to the positive pole of the supply battery, as well as a maximum positive potential on the *b* wire compared to the negative pole of the supply battery. Resistor R and also relay I lie on a smaller negative voltage compared to the positive pole of the supply battery. The low negative voltage (—), which is conducted to the base *b* of transistor TS across resistor R, is neutralized, however, by the relay B which has a relatively low ohmic resistance compared to the high-ohmic resistor R, this being the reason for the blocking of transistor TS. A weak power circuit is formed: Battery positive, B, *b*, D2, R, partial voltage negative (—).

When the supervised subscriber's receiver is lifted, a voltage shift is produced on the talking lines *a* and *b* by the loop connection. This voltage shift is positive compared to the battery negative and negative compared to the battery positive. The negative voltage on the talking lines *a* and *b* is much higher compared to the battery positive than the low negative partial current (—) which lies closer to the positive pole of the battery and on which resistor R and also relay I lie, thus accounting for it being positive compared to the talking lines, so that a weak current would flow across resistor R towards the talking lines but is prevented from doing so by the blocking effect of the two diodes D1 and D2. This higher negative voltage on the talking lines compared to the low negative partial voltage (—) is taken as criterion for connecting the registering device, as well as picking-up and transmitting the signals for registering, and also blocking the picking-up of those signals, caused by interruptions in the subscriber line originating at the exchange.

Due to the fact that transistor TS is conducting, relay I is excited. Relay V becomes active across the former's contact *i* and the opening of relay V's contact $v^1$ prepares the way for preventing the transistor from being blocked. A further contact of relay V, not marked in, effects the connecting of the registering device in the known manner. Relay C is exited after a free group selector or register.

When a number is dialed on the supervised subscriber's receiver, relay I drops out during every interruption on the subscriber line, whereas the signals produced by the calling dial or similar signal generator are picked up for registering.

After the call is concluded and the connection disengaged, the voltage on the *a* wire changes over to the maximum negative voltage compared to the battery positive, the voltage on the *b* wire, however, changes over to the maximum positive voltage compared to the battery negative, with the result that a weak current again flows from the battery positive B, *b*, D2, R towards the negative partial voltage (—), so that the base *b* of transistor TS is likewise positive compared to the positive emitter *e*, i.e. it is neutralized and the transistor is again blocked. At the same time relays I, V and C drop out and the registering device is disconnected.

By arranging diode D1 next to diode D2 it has been possible to connect talking lines *a* and *b* to the picking-up device independent of polarity, the talking lines being interchangeable with each other. If a negatively sensitive amplifier is employed, as shown in FIGURE 1 by way of example, the *b* wire lying on the battery positive now has to be conducted to the picking-up device, whereas, if a positive sensitive amplifier, e.g. a NPN transistor, is employed, the *a* wire lying on the battery negative has to be conducted to the picking-up device, the two diodes D1 and D2 have to be connected away from each other in their through direction, registor R and relay I have to be laid to a low positive partial voltage with respect to the battery negative and the emitter *e* laid to the battery negative.

The employing of a negative-sensistive amplifier, as shown in the diagram by way of example, has the advantage, however, that in the case of subscribers with low-frequency telephone transmission, provided by earthing the *a* wire (battery positive) across a key fitted to the subscriber station, the program selector can be operated without the negative-sensistive connecting device reacting.

Should the registering device be connected to the distribution frame at the exchange, in which case the *c* wire is not always provided, or at the subscriber's end, itself, capacitor K can be connected in parallel to resistor R by closing switch S2, with the result that, in the case of a call being made to the supervised subscriber station, a positive voltage will be built up across diodes D1 and D2 to the base *b* of transistor TS during the no-lead period (alternating current) thus keeping the transistor blocked. This prevents any reaction on the part of relay I as well as the connecting of the registering device until the subscriber answers, whereupon connecting is effected and the paper feed is shifted a step forward.

The principal advantages of the present invention are the following:

(a) Due to the arrangement of the diodes, which are connected away from or towards each other in their through direction and lie as *a* lines in the direction of the switching and picking-up device or in the reverse direction during the call.

(b) The very weak current which, during the no-load state of the subscriber station, flows from one of the two talking lines to the switching and picking-up device when the two diodes are connected towards each other in their direction and from the switching and picking-up device to one of the two talking lines when the two diodes are connected away from each other in their direction, is of absolutely no importance.

(c) The connecting of the registering device, transmitting of signals for registering, and blocking of those signals generated from the exchange are achieved by means of only one relay.

(d) By employing a high-ohmic resistor, the impulse ratio of the relay is not influenced by the resistance of the subscriber line.

(e) No additional attenuation is created by the connecting of the switching and picking-up device when connecting the call.

Having thus disclosed the invention, what is claimed is:

1. In a signal detector and registering circuit in an automatic telephone exchange having a subscriber station including a subscriber circuit and a supervisory circuit, two diodes connected to each other and connected between the talking lines of the subscriber circuit, said two diodes constituting a bridge adapted as an input circuit to a semiconductor amplifier, a semiconductor amplifier connected at its input to the midpoint between said two diodes, a fast release relay connected to the output of said semiconductor amplifier, a slow release relay connected to the output of said fast release relay and connected to a registering device in a registering circuit, a high ohmic relay connecting the supervisory circuit to said registering circuit, a supply battery energizing said high ohmic relay and said semiconductor amplifier, a changeover switch for connecting said high ohmic relay alternately to the negative and positive poles of said supply battery which cuts off the registering circuit and blocks the semiconductor amplifier on a call from the supervisory circuit.

2. A circuit as claimed in claim 1, wherein said semiconductor amplifier is an NPN transistor and wherein said registering circuit includes a capacitor and a resistor in parallel with said NPN transistor and said transistor is connected to the positive terminal of said supply battery whereby cross-talk and attenuation are minimized.

References Cited

UNITED STATES PATENTS

| | | | |
|---|---|---|---|
| 3,129,289 | 4/1964 | Seeman | 179—18.3 |
| 3,134,857 | 5/1964 | Kolbinger | 179—18.3 |

KATHLEEN H. CLAFFY, *Primary Examiner.*

LAURENCE WRIGHT, *Assistant Examiner.*